US 11,062,575 B2

(12) United States Patent
Copen et al.

(10) Patent No.: US 11,062,575 B2
(45) Date of Patent: Jul. 13, 2021

(54) WIRELESS TILT SENSOR SYSTEM AND METHOD

(71) Applicants: Travis Copen, Stow, OH (US); David Kolar, Stow, OH (US)

(72) Inventors: Travis Copen, Stow, OH (US); David Kolar, Stow, OH (US)

( * ) Notice: Subject to any disclaimer, the term of this patent is extended or adjusted under 35 U.S.C. 154(b) by 0 days.

(21) Appl. No.: 16/693,888

(22) Filed: Nov. 25, 2019

(65) Prior Publication Data

US 2020/0160676 A1 May 21, 2020

Related U.S. Application Data

(63) Continuation of application No. 16/069,022, filed as application No. PCT/US2017/013138 on Jan. 12, 2017, now Pat. No. 10,504,344.

(Continued)

(51) Int. Cl.
*G08B 13/08* (2006.01)
*B60R 25/00* (2013.01)
(Continued)

(52) U.S. Cl.
CPC .............. *G08B 13/08* (2013.01); *B60R 25/00* (2013.01); *B60R 25/10* (2013.01); *G08B 21/00* (2013.01); *B60R 25/1004* (2013.01)

(58) Field of Classification Search
CPC . B65R 25/10; B65R 25/1001; B65R 25/1006; B54R 25/1004; G08B 21/00;
(Continued)

(56) References Cited

U.S. PATENT DOCUMENTS

RE38,400 E     1/2004 Kowall et al.
2011/0025486 A1*  2/2011 Qian .................. B60Q 9/00
                                              340/438
(Continued)

FOREIGN PATENT DOCUMENTS

CN     201633624 U    11/2010

OTHER PUBLICATIONS

The International Search Report and Written Opinion of the International Search Authority. Authorized officer: Lee W. Young. International Application No. PCGT/US2017/013138. International Filing Date Jan. 12, 2017.

*Primary Examiner* — Van T Trieu
(74) *Attorney, Agent, or Firm* — Vorys, Sater, Seymour and Pease LLP; Scott M. Guttman

(57) ABSTRACT

A wireless sensor system and method detects when a tailgate, door, or other object on a vehicle moves from a closed position to an open position and then generates an alarm. The wireless sensor system includes a wireless sensor and a transceiver module. The transceiver module is plugged into a cigarette lighter of the vehicle to receive its power. The wireless sensor detects a movement of an object on a vehicle from a first position to a second position. The wireless sensor transmits data indicating the object moved from the first position to the second position to the transceiver module. The transceiver module receives the transmitted data and determines whether to cause an alarm to be generated based, at least in part, on the transmitted data. When an alarm is to be generated, the transceiver module causes the alarm to be generated.

20 Claims, 4 Drawing Sheets

Related U.S. Application Data

(60) Provisional application No. 62/278,060, filed on Jan. 13, 2016.

(51) Int. Cl.
*B60R 25/10* (2013.01)
*G08B 21/00* (2006.01)

(58) Field of Classification Search
CPC ............... G08B 21/02; G08B 21/0407; G08B 21/0438; G08B 21/0461; G08B 21/0469; G08B 21/0476; G08B 21/06; H04W 4/00; H04W 4/04; H04W 4/046; H04W 4/11; B60R 16/03; B60Q 9/00; G01S 13/93; G01S 13/931
See application file for complete search history.

(56) References Cited

U.S. PATENT DOCUMENTS

| | | |
|---|---|---|
| 2011/0084807 A1 | 4/2011 | Logan et al. |
| 2012/0169503 A1* | 7/2012 | Wu ........................ G08B 21/06 340/575 |
| 2015/0254913 A1 | 9/2015 | Obata et al. |
| 2015/0291127 A1 | 10/2015 | Ghabra |
| 2015/0296117 A1 | 10/2015 | Johnson |
| 2015/0382156 A1* | 12/2015 | Gruteser ................ H04W 4/44 455/456.1 |
| 2016/0006577 A1 | 1/2016 | Logan |
| 2016/0110618 A1* | 4/2016 | Oba .................... G06K 9/6215 348/148 |
| 2017/0210357 A1* | 7/2017 | Nagai ...................... B60T 7/14 |
| 2018/0009377 A1 | 1/2018 | Troutman et al. |

\* cited by examiner

30

WIRELESS TILT SENSOR SYSTEM AND METHOD

CROSS-REFERENCE TO RELATED APPLICATIONS

This application is a continuation application of National Stage Application Ser. No. 16/069,022 filed Jul. 10, 2018, now U.S. Pat. No. 10,504,344, which claims priority to International Application No. PCT/US2017/013138 filed Jan. 12, 2017, which claims priority from U.S. Patent Application No. 62/278,060 filed on Jan. 13, 2016, which are incorporated by reference herein in their entirety.

FIELD OF THE INVENTION

The current invention relates generally to apparatus, systems, and methods for determining the position of a tailgate, door, or the like. More particularly, the apparatus, systems, and methods relate to using one or more sensors on a vehicle to determine the position of a tailgate, door, or the like.

BACKGROUND OF THE INVENTION

Smaller trucks, such as those commonly referred to as pick-up trucks, often have rear tailgates that move from a vertical closed position to a horizontal open position about a horizontal axis. Larger trucks, such as box trucks, semi-tractor trailers often have one or more rear doors that pivot vertically from open to closed positions. When in transit, these doors should normally be in a closed position to prevent cargo from sliding from or falling off of the truck. It is frequently difficult for an operator to see a truck's rear tailgate or cargo door because of the vehicle design or cargo that is blocking the view. A trailer being pulled by a truck cab may obstruct the operator's sight of doors on the rear of the trailer. What is needed is a better way to know what position tailgates, doors, and other objects on vehicles.

SUMMARY OF THE INVENTION

Some embodiments herein are directed towards a wireless sensor system to detect whether an object, such as a tailgate, door, or other object is in a desirable position. The wireless sensor system may include a wireless sensor and a transceiver module. The sensor may be mounted on or off the object, and may be configured to wirelessly transmit data indicative of whether the object is in the desirable position. The transceiver module may be adapted to wirelessly receive the transmitted data and to determine whether to cause generation of an alarm based, at least in part, on the transmitted data, wherein the alarm is indicative of whether the object is in the desirable position, and wherein the transceiver module continuously monitors voltage of the vehicle and determines when the vehicle is starting by detecting drop in voltage of the vehicle.

In some embodiments described herein, the wireless sensor system comprises a sensor adapted to detect a movement of an object, wherein the sensor is configured to wirelessly transmit data indicative of whether the object is in a desirable position; and a transceiver module adapted to wirelessly receive the transmitted data and to determine whether to cause generation of an alarm indicative of whether the object is in the desirable position, wherein the transceiver module determines when a power up condition occurs and, upon occurrence of the power up condition, determines whether the object is in the desirable position. The sensor may be attached to the object, or may be unattached to the object.

In some embodiments described herein, a method for detecting the movement/position of a vehicle tailgate is provided. The method initially detects, with a wireless sensor on the vehicle, a first position of the object. Next, the wireless sensor detects that the object has moved to a second position. The sensor wirelessly transmits the information from the sensor to a transceiver module plugged into a cigarette socket of the vehicle. The information indicates a change in position of the tailgate, or simply that the tailgate is not in the first or closed position.

BRIEF DESCRIPTION OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples, one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION OF THE DRAWINGS

Figure 1:
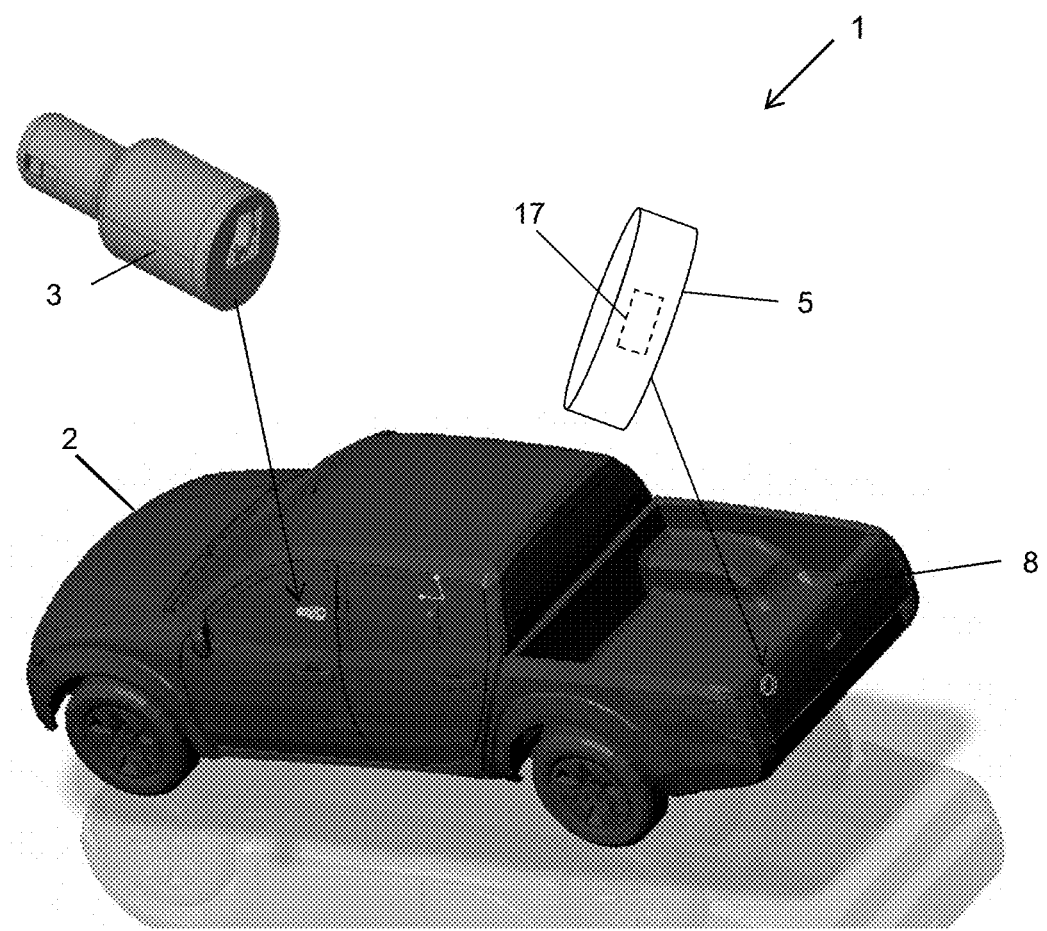
FIG. 1 illustrates one example wireless sensor system for detecting when a tailgate is open on a vehicle.

FIG. 1 illustrates one representative embodiment of a wireless sensor system 1 that determines the position of a rear tailgate 8 of a truck/vehicle 2 and alerts its driver when there is an undesirable change in the status of tailgate 8. For example, system 1 may generate a visible and/or audio alert when tailgate 8 is moved from a closed position to an open position. System 1 may, in other embodiments, be used on other motor vehicles, farm equipment, construction equipment, or other types of equipment to alert operators of an undesirable position or change in position of an object attached to the corresponding vehicle. For example, positional information of a snow plow blade, a tractor attachment, and the like may be useful for its operator to know. Wireless sensor system 1 eliminates potentially hazardous conditions in which, for example, an open tailgate could cause the loss of property, create road hazards, or theft.

Wireless sensor system 1 comprises of two primary devices: a transceiver module 3 and a wireless sensor 5. As discussed below, transceiver module 3 receives wireless signal/data from wireless sensor 5 that indicates the position of an object such a door or tailgate 8. Transceiver module 3 then displays an indicator (affirmatively or even the absence of any alarm) upon transceiver module 3 and/or causes a position indicator or alarm to be displayed on a vehicle display system or dashboard, on another device, such as a mobile phone, or on another suitable device.

Figure 3:
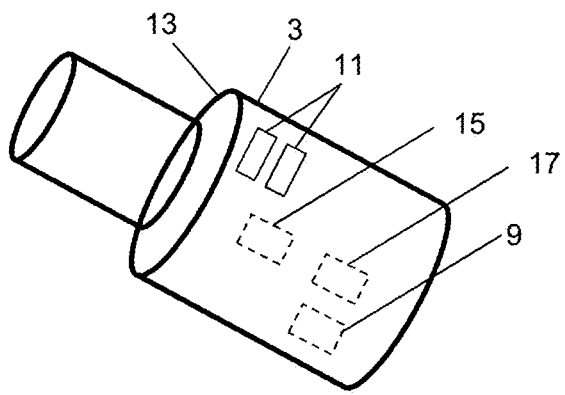
FIG. 3 illustrates example details of the transceiver module of the wireless sensor system.

Transceiver module 3 and wireless sensor 5 may be implemented with various functional logic units that implement the functionality of these devices. For example, transceiver module 3 may be implemented with alarm logic 15, as illustrated in FIG. 3, that generates signals to active lights and/or audible devices to indicate a status of a tailgate, door, and the like to an operator of vehicle 2.

"Logic", as used herein, includes but is not limited to hardware, firmware, software, and/or combinations of each to perform a function(s) or an action(s), and/or, to cause a function or action from another logic, method, and/or system. For example, based on a desired application or need, logic may include a software-controlled microprocessor, discrete logic such as an Application-Specific Integrated Circuit (ASIC), a programmed logic device, a memory device containing instructions or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

Figure 2:
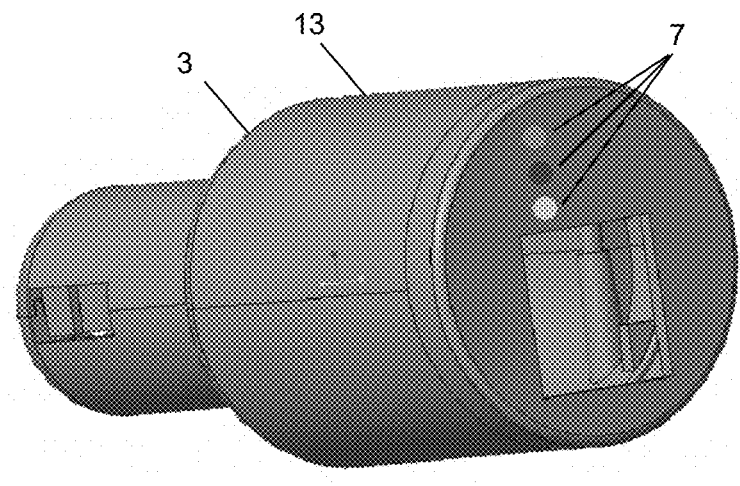
FIG. 2 illustrates an example transceiver module of the wireless sensor system.

As illustrated in FIG. 2, transceiver module 3 may be implemented in various configurations having different functionality. For example, in one embodiment, transceiver module 3 may be a USB charger/transceiver and may plug into an existing 12V auxiliary power outlet in the cabin of a vehicle. Transceiver module 3 may have a 12V round power connector that may be plugged into a cigarette lighter connector. For example, the lighter connector may have two USB charging points 11, as illustrated in FIG. 3, and may be similar to a USCAR4 lighter connector. This transceiver module 3 may additional have status indication lights 7 and an audible alarm unit 9.

In more detail, and in some configurations, transceiver module 3 may be a USB type of charger/transceiver conforming to the SAE/USCAR4 standard for cigarette lighters and power outlets. USB charging points 11 may have a minimum of power of two amps each. Some embodiments of transceiver module 3 may have status lights 7. Status lights 7 may be a single tricolor light or alternatively multiple individually colored status lights. The individually colored lights may be, by way of example only, a red light to indicate a tailgate or door is open, a green light to indicate a tailgate or door is closed, and an orange light to indicate the battery power of wireless sensor 5 is low, or other such "error" indication. Lights 7 may be illuminated backlights and when activated may shine through a translucent bezel. Lights 7 may be LED indicators and in one embodiment are vertically oriented, but may be other illumination devices as understood by those of ordinary skill in the art. Transceiver module 3 may include a circuit board that is preferably no more than a two-sided board, populated from one direction. A buzzer adapted to generate audio signals internal to transceiver module 3 may operate at about 83 dBA-2.3 KHz and may be similar to the open air (PUI AUDIO P/N #Al-1223-TWT-3V-2-R) type of buzzer.

Transceiver module 3 components may be mounted in a housing 13 that is, for example, a housing made out of rigid material such as plastic. For ease of assembly, housing 13 may be formed with two halves as illustrated and best seen in Figure Housing 13 may be any suitable color and in some embodiments is colored black with translucent bezel areas over lights 7.

"Rigid material" is defined herein as any material that retains its shape when formed and that is not a liquid or a gas. For example, rigid materials include metal steel, aluminum, plastics, wood, etc.

In one example, the transceiver module 3 is configured to integrate with the vehicle's 2 computer and electrical systems (not shown). For example, the transceiver module 3 may be plugged into the vehicle's 2 OBD2 port, or on-board diagnostics port, or any other suitable vehicle port in order to communicate with the vehicle's 2 systems. It should be appreciated that the transceiver module 3 may communicate with the vehicle's systems either wirelessly or via a wired connection. The transceiver module 3 may further be configured to communicate information received from the wireless sensor 5 to from a user or driver via the vehicle's 2 systems. For example, the transceiver module 3 may alert the user via the vehicle's 2 dashboard after receiving notification from the wireless sensor 5 that a tailgate 8 is in an open position.

In one example, the transceiver module 5 may be configured to communicate information to a smartphone or other similar type of mobile computing device, via Bluetooth or other suitable wireless protocol, and therefore provide a user an alert or a notification of an open tailgate 8 via the computing device.

Referring again to FIG. 1, wireless sensor 5 is affixed to the tailgate 8. Those of ordinary skill in the art will appreciate that sensor 5 may be attached to rear tailgate 8 of vehicle 2 using screws, bolts, other mechanical fasteners, adhesive, or in other known ways. Sensor 5 may operate from a battery power, solar power, regenerative power source, or other power source as also understood by those of ordinary skill in the art. Depending on the transmission distance, wireless sensor 5 may take various forms to house larger or more power transmitters, larger solar cells or other components that would increase transmission distance or general function. In some embodiments, sensor 5 may be a wireless tilt sensor. In one example, the sensor 5 has an accelerometer and/or a gyroscope for detecting orientation and therefore determining when a tailgate 8 is in an open or closed position. Thus, it should be appreciated that the sensor 5 may self-sufficient in the sense that it can measure and determine position and orientation without relying on additional external components.

Even though wireless sensor 5 is depicted in the FIG. 1 as mounted on a pickup truck, sensor 5 may be mounted on a lift gate or doors of a semi-tractor trailer, moving objects on farm equipment, and the like. Sensor 5 also may be mounted to double or single swinging doors. When mounted in these configurations, sensor 5 (reed switch, Hall-effect sensor, or the like) may then be actuated by magnet or other noncontact means. In other configurations, sensor 5 also may be actuated by a mechanical switch.

Wireless sensor 5 may be of a suitable shape to house its internal components in a housing that is formed with rigid material such as plastic or another suitable material. In some configurations, the sensor 5 is cylindrical in shape and has dimensions smaller than 1.5" dia×⅜". As previously mentioned, wireless sensor 5 may have a solar cell for recharging sensor 5.

In other configurations, wireless sensor system 1 may also provide a warning to an operator of vehicle 2 that an object is behind the vehicle 2 when backing or that the vehicle is near a wall or other object. As understood by those in ordinary skill in this art, this functionality may be implemented by processing images taken by the same or an additional wireless sensor 5 and/or emitting electromagnetic waves from sensor 5 and determining how far an object is from the rear of vehicle 2 by determining how long it takes these electromagnetic waves to bounce from the object and return to sensor 5. Object detection logic 17 within sensor 5 and/or transceiver module 3 may implement some of the algorithms and logic for detecting objects near the rear of vehicle 2. This information associated with objects near the rear of vehicle 2 may be transmitted to a Bluetooth device or other such device inside the cabin of vehicle 2 and also may be forwarded a user's phone or mobile computing device that is in proximity to vehicle 2.

To conserve energy, sensor 5 may be powered down when the vehicle gate is open. For example, a tilt switch within sensor 5 may cut power to the device. Transceiver module 3 may then assume the gate is down or the door is open when there is no signal and would be a method to possibly conserve power. Wireless sensor 5 would also have a power save mode and the sensor changing state in any way would wake it as another means of power conservation.

In some configurations, but not in all required in configurations, wireless sensor system 1 may be implemented in other useful ways and have other features. For example, wireless sensor system 1 may be implemented, at least in part, according to the Bluetooth Low Energy (BTLE) standard or the ANT+ protocol. In other configurations, sensor 5 will be able transmit to transceiver 3 from a middle position of the tailgate, with the tailgate in any position (open, closed or in between) to the transceiver module 3, with a test load of metal obstructions (metal tools and building materials in the bed).

It should be appreciated that the sensor 5 may be configured to communicate with multiple devices, either simultaneously or consecutively. For example, the sensor 5 may be configured to send information regarding an open tailgate 8 to the transceiver module 3, to the vehicle's systems, as well as to a mobile computing device. Thus, the driver of the vehicle 2 may receive redundant alerts in case one of the alerts is missed.

Having described the components' wireless sensor system 1 along with some of their features, the operation of the overall wireless sensor system 1 is now presented. For example, when the tailgate of vehicle 2 is moved from an upward closed position to a downward open position, wireless sensor 5 detects this motion and sends a wireless signal to the transceiver indicating this movement. Wireless sensor 5 may detect this by detection a pressure switch being released, a change in magnetic field at switch 5, or in other ways. Transceiver module 3 may decode the signal/message from wireless sensor 5 and determine whether to generate an audible alarm, generate a light signal, and/or generate other alarms or signals via an alarm interface. For example, alarm generation logic 15 within transceiver module 3 may generate an alarm/alert that is audible and with a continued blink at a rate of one second on/one second off at one of the lights 7 such as a red LED.

In some configurations, when the tailgate is later moved from the open position to the upward closed position, wireless sensor 5 detects this motion and sends a wireless signal to transceiver indicating this movement. Wireless sensor 5 may detect this by detecting a pressure switch being pressed back down, may detect a change in magnetic field at the pressure switch, or in other ways. Transceiver module 3 may decode the signal/message from wireless sensor 5 and determine the tailgate has been closed. Upon detecting this, alarm generation logic 15 within transceiver module 3 may turn off the red LED and illuminate a green LED into a constant green, non-blinking light, and terminate the audio alarm.

While the previous example has been presented as an example of detecting the movement of a tailgate of a truck, wireless sensor system 1 may operate similar in other vehicles for monitoring swinging doors on other trucks, the movement of components on farm equipment, and the like. In some other configurations, the actuation of sensor 5, and sensor 5 itself, may be configured in other ways or be comprised of a reed switch or Hall-effect sensor on the sensor side and a magnet on the opposing door or door frame. When the sensor 5 comes into close proximity of the magnet it would then change state to indicate a door is closed.

It should be appreciated that two differing conditions may exist for a vehicle start up. In certain vehicles, the power ports remain on so it may be necessary to detect the voltage fluctuation of vehicle 2 at start up. For example, many vehicles made outside of the US will turn off the cigarette lighter outlet with the ignition so that transceiver module 3 may not be powered at start up when used in such a vehicle. Of course, in these types of vehicles, the vehicle power outlet will be off and transceiver module 3 will energize soon after the vehicle starts. In these conditions, transceiver module 3 may have logic and circuits to wait for a full power up condition before deciding whether the tailgate 8 is up or down. A check of the status of the gate or door 8 is performed soon after power up of the transceiver module 3.

Figure 4:
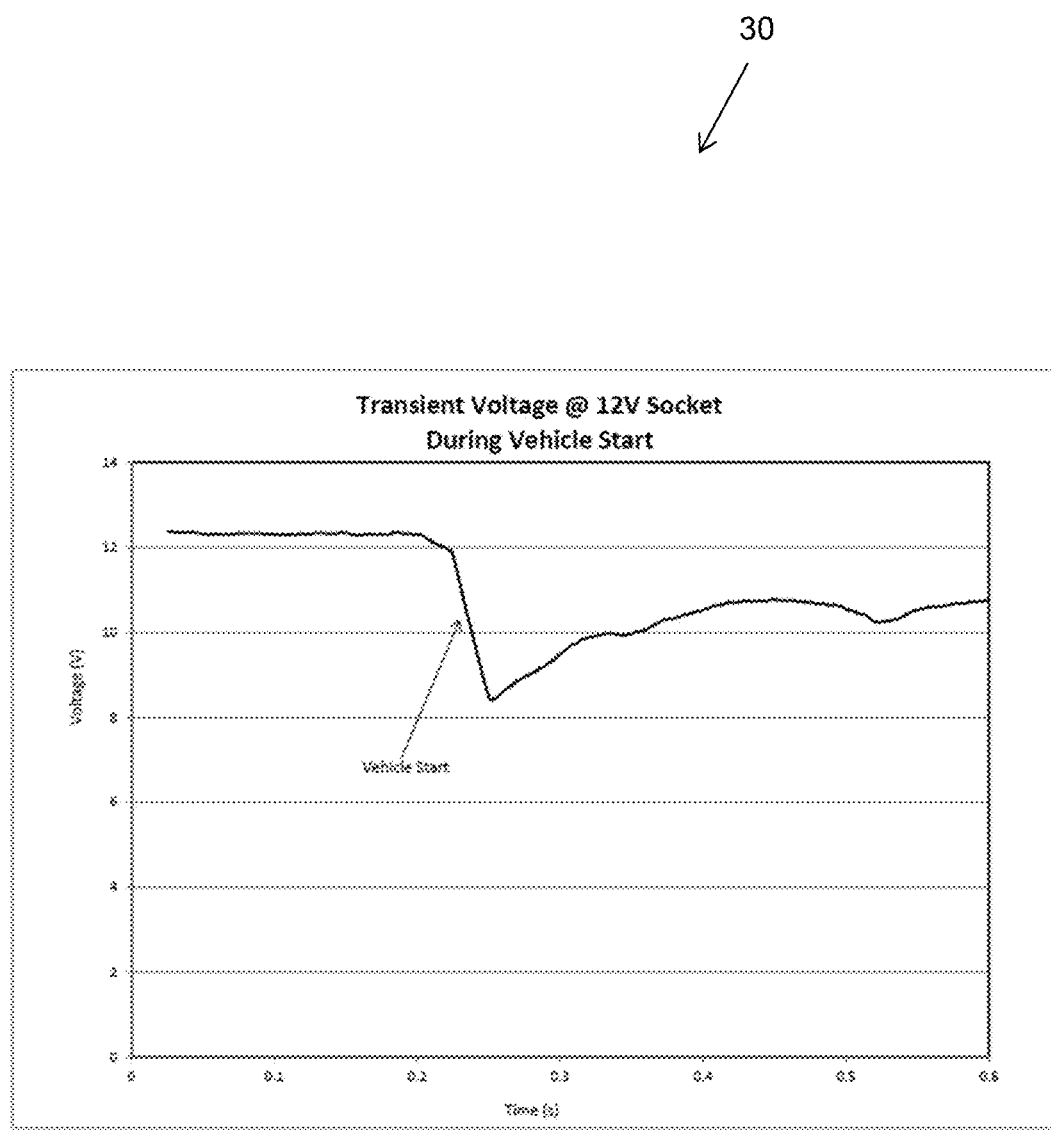
FIG. 4 is a chart illustrating exemplary voltage fluctuation for a variety of vehicles.

However, in contrast with other vehicles, the socket is continually powered. However, there may be a voltage fluctuation during vehicle startup on the socket which is illustrated in the chart 30 of FIG. 4 for a variety of different vehicles. In this case, wireless sensor system 1 will automatically check for the tailgate 8 down or door open condition when the vehicle 2 is started. In particular, the wireless sensor system 1 is able to determine when a vehicle is starting up by detecting the voltage fluctuation. If the tailgate 8 is down or door is open and the dip in voltage is detected, transceiver module 3 may cause a red light 7 to flash. In some configurations, transceiver module 3 may contain logic to generate a pause of one second upon the start of the vehicle 2 and then commence a beeping sequence. One second after the beep sequence has ended, transceiver module 3 may repeat the beep sequence for a total of two beep sequences. The transceiver module 3 may continue to flash a red light 7 until the tailgate or door is later closed.

It should be appreciated that such a vehicle check is performed when the vehicle 2 is started since a driver may have forgotten that the gate 8 is down or the door is open or someone else could have opened the door without the driver's knowledge. Performing the check when the vehicle 2 is started is significant as this is the time when an incident is most likely preventable. In particular, this is the time when the driver is in close proximity of the alarm (i.e. in the cigarette lighter) and driver can therefore be warned before the vehicle 2 moves.

Example methods may be better appreciated with reference to flow diagrams. While for purposes of simplicity, explanation of the illustrated methodologies are shown and described as a series of blocks. It is to be appreciated that the methodologies are not limited by the order of the blocks, as some blocks can occur in different orders and/or concurrently with other blocks from that shown and described.

Moreover, less than all the illustrated blocks may be required to implement an example methodology. Blocks may be combined or separated into multiple components. Furthermore, additional and/or alternative methodologies can employ additional, not illustrated blocks.

Figure 5:
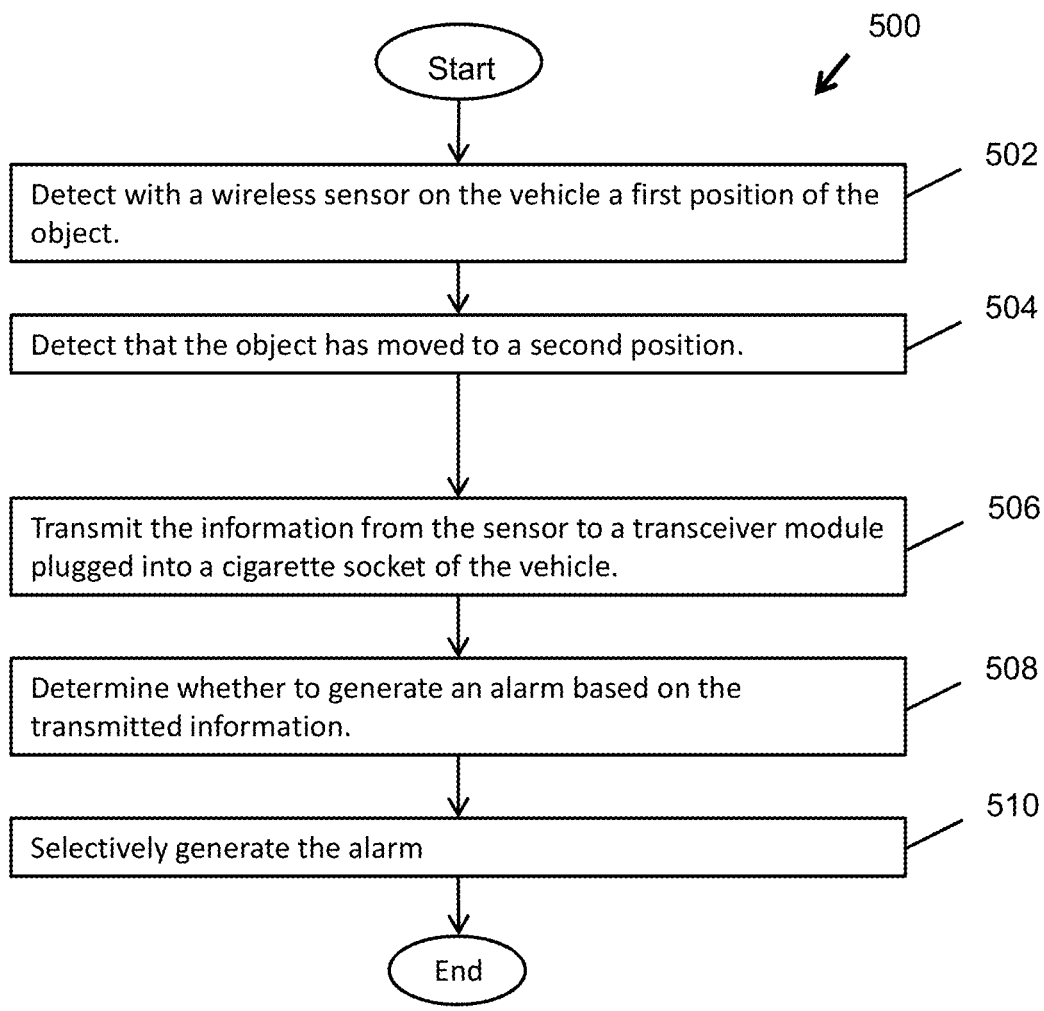
FIG. 5 illustrates an example method of detecting tailgate position and generating a notification.

FIG. 5 illustrates a method 500 method of detecting a position of an object on a vehicle. Method 500 begins by detecting with a wireless sensor on the vehicle a first position of the object, at 502. Next, the wireless sensor detects that the object has moved to a second position, at 504. The sensor wirelessly transmits the information, at 506, from the sensor to a transceiver module plugged into a cigarette socket of the vehicle. The information indicates a change in position of the object from the first position to the second position. The transceiver module determines whether to generate an alarm based on the transmitted information, at 508. An alarm unit selectively generates the alarm, at 510, based, at least in part, on the selective determination.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example" and so on, indicate that the embodiment(s) or example(s) so described may include a particular feature, structure, characteristic, property, element, or limitation, but that not every embodiment or example necessarily includes that particular feature, structure, characteristic, property, element, or limitation.

What is claimed is:

1. A wireless sensor system comprising:
   a wireless sensor adapted to detect an object's first position on a vehicle and the object's second position on the vehicle, wherein the wireless sensor is configured to wirelessly transmit data indicative of the first position and second position; and
   a transceiver module adapted to wirelessly receive the transmitted data and to determine whether to cause an alarm to be generated based, at least in part, on the transmitted data, wherein the alarm is indicative of the object's position.

2. The wireless sensor system of claim 1, wherein the transceiver module is adapted interface with a cigarette lighter of the vehicle.

3. The wireless sensor system of claim 1, wherein the transceiver module is adapted to interface with a computing system of the vehicle.

4. The wireless sensor system of claim 3, wherein the transceiver module is adapted to interface with the vehicle's computing system via an on-board diagnostic port.

5. The wireless sensor system of claim 1, wherein the transceiver module is adapted to interface with a mobile computing device.

6. The wireless sensor system of claim 1, wherein the transceiver module is adapted to interface with a plurality of devices.

7. The wireless sensor system of claim 1, wherein the transceiver module comprises an alarm interface, and wherein the transceiver module is adapted to communicate an alarm via the alarm interface.

8. The wireless sensor system of claim 1, wherein the wireless sensor comprises an accelerometer, wherein the sensor is adapted to determine orientation using the accelerometer.

9. The wireless sensor system of claim 1, wherein the wireless sensor is adapted to detect an object behind the vehicle.

10. The wireless sensor system of claim 1, wherein the transceiver module is adapted to determine when a vehicle starts by detecting a voltage fluctuation, and wherein the wireless sensor is adapted to detect the object's position automatically when the vehicle starts.

11. A method of detecting a position of an object on a vehicle comprising:
    detecting with a wireless sensor on the vehicle a first position of the object;
    detecting with the wireless sensor that the object has moved to a second position;
    wirelessly transmitting information from the sensor to a transceiver module, wherein the information indicates a change in position of the object from the first position to the second position;
    selectively determining at the transceiver module whether to generate an alert based on the transmitted information; and
    selectively generating the alert, wherein the alert is indicative of the object's position.

12. The method of claim 11, wherein the step of wirelessly transmitting information from the sensor to a transceiver module comprises wirelessly transmitting information from the sensor to a transceiver module interfaced with a cigarette lighter of the vehicle.

13. The method of claim 11, wherein the step of selectively generating the alert comprises communicating an alert to a dashboard of the vehicle.

14. The method of claim 13, wherein the step of selectively generating the alert comprises interfacing with the vehicle via an on-board diagnostic port.

15. The method of claim 11, wherein the step of selectively generating the alert comprises communicating an alert to a mobile computing device.

16. The method of claim 11, wherein the step of selectively generating the alert comprises communicating an alert to a plurality of devices.

17. The method of claim 11, wherein the step of selectively generating the alert comprises communicating an alert to an alarm interface of the transceiver module.

18. The method of claim 11, wherein the step of detecting with the wireless sensor that the object has moved to a second position comprises the wireless sensor using an accelerometer to detect the movement.

19. The method of claim 11, further comprising the step of detecting an object behind the vehicle.

20. The method of claim 11, wherein the step of detecting with a sensor on the vehicle a first position of the object comprises automatically determining that the vehicle is starting up by detecting a voltage fluctuation and detecting with the sensor a first position of the object responsive to determining that the vehicle is starting up.

* * * * *